United States Patent [19]

Stout

[11] Patent Number: 4,512,634
[45] Date of Patent: Apr. 23, 1985

[54] MOUNTING ASSEMBLY FOR SCHOOL BUS MIRROR

[75] Inventor: Thomas R. Stout, Lambertville, Mich.

[73] Assignee: Safety Cross Mirror Co., Inc., Lambertville, Mich.

[21] Appl. No.: 518,120

[22] Filed: Jul. 28, 1983

[51] Int. Cl.³ .......................... G02B 5/08; G02B 5/10
[52] U.S. Cl. ...................................... 350/632
[58] Field of Search ............................... 350/307, 302

[56] References Cited

FOREIGN PATENT DOCUMENTS 0794962  5/1958  United Kingdom ............... 350/307

Primary Examiner—John K. Corbin
Assistant Examiner—Richard Gallivan
Attorney, Agent, or Firm—Allen D. Gutchess, Jr.

[57] ABSTRACT

A mounting assembly for a school bus mirror is provided. The mounting assembly is particularly designed for a front view mirror wherein the driver can have visual access to the area in front of the bus hood which is hidden from direct view. The mounting assembly includes one upright, generally Z-shaped tubular arm and one tubular brace. A lower leg of the tubular arm is frictionally mounted on the side of the bus fender by two one-piece brackets. The tubular brace has one end mounted on the front of the bus and has a slot at the other end which is frictionally connected to an intermediate leg of the main arm by a brace clamp. The configuration of the main arm enables the mirror to be in a position to provide the necessary front visual access. The slotted brace and bracket arrangement enable the main arm to yield and swing rearwardly in the event an object is encountered. The mounting assembly is adaptable for a variety of bus configurations, is relatively inexpensive, and comprises relatively few pieces.

16 Claims, 5 Drawing Figures

U.S. Patent  Apr. 23, 1985  4,512,634
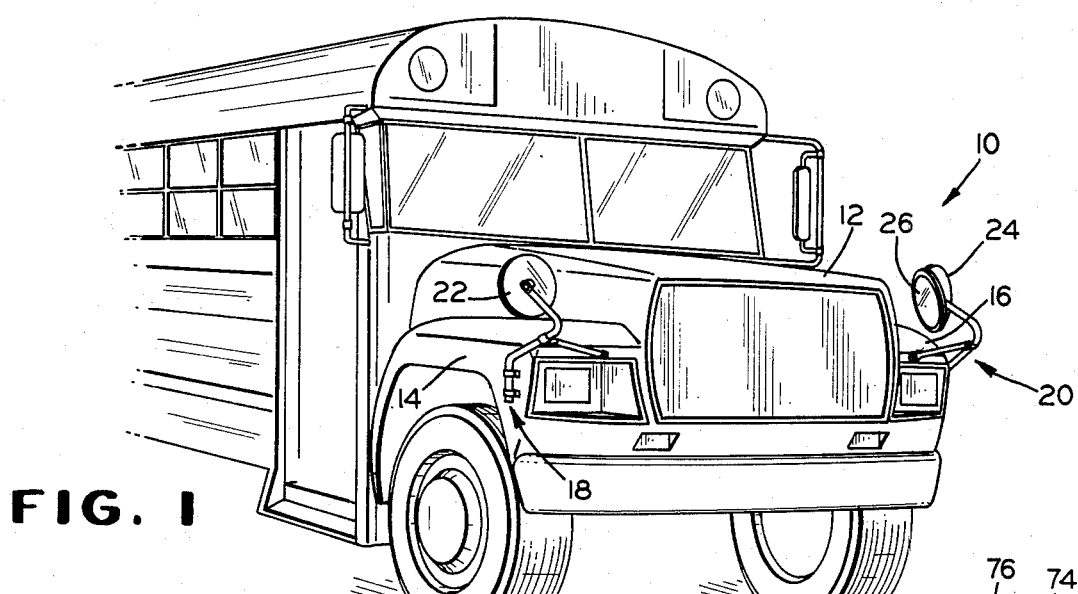
FIG. 1
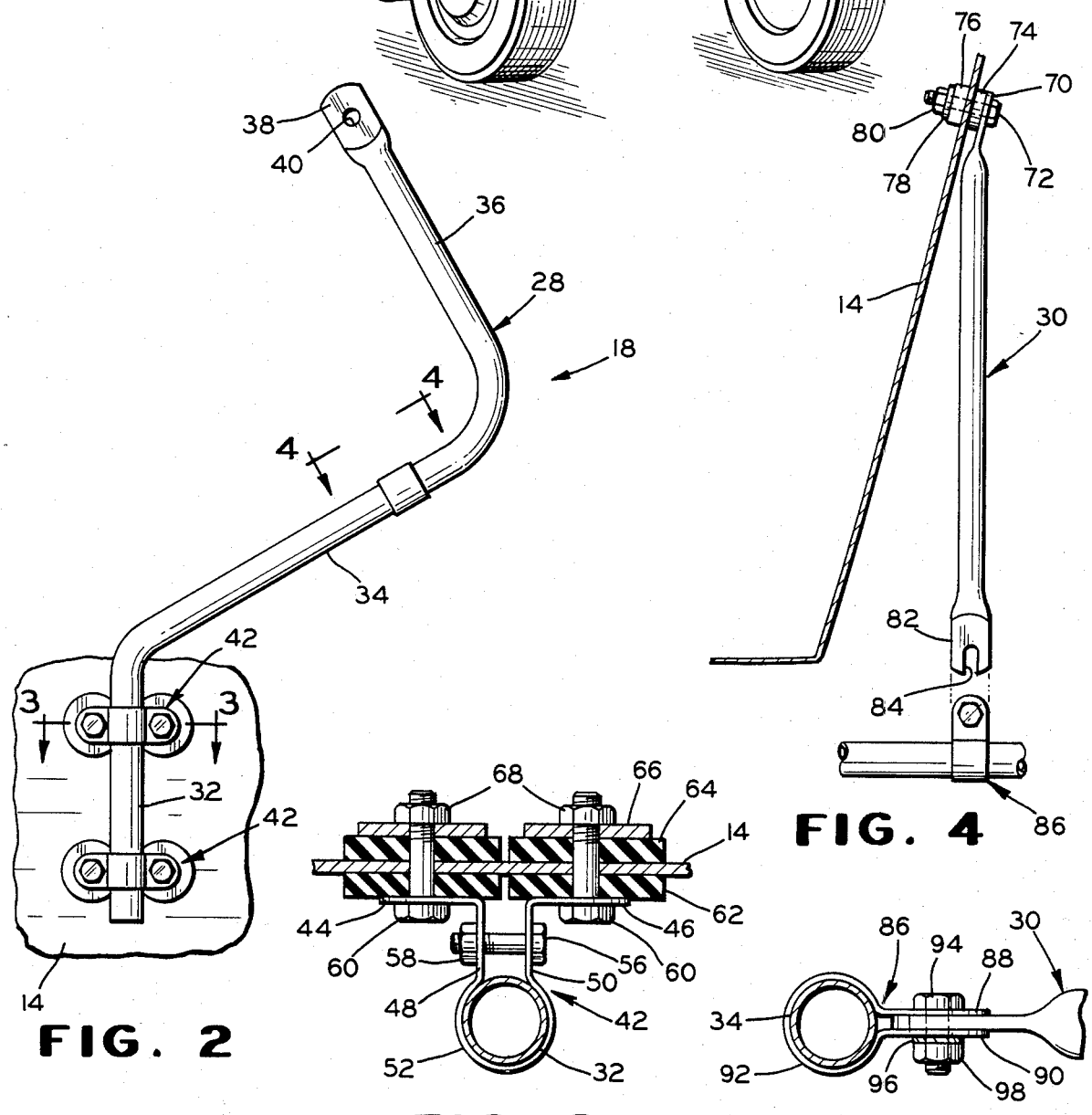
FIG. 2
FIG. 3
FIG. 4
FIG. 5

MOUNTING ASSEMBLY FOR SCHOOL BUS MIRROR

BRIEF SUMMARY OF THE INVENTION

This invention relates to a mounting assembly for a school bus mirror.

A number of mounting assemblies for rear view mirrors for vehicles including buses are known in the art. The mounting assembly in accordance with the invention is particularly designed for convex mirrors to provide a driver with visual access to the area in front of the school bus, particularly to determine whether the area is clear of children. The mounting assembly includes one upright, generally Z-shaped tubular arm and one tubular brace. The generally Z-shaped arm includes an upright lower leg or portion, an intermediate leg or portion extending forwardly and upwardly from the lower leg, and an upper portion extending upwardly and rearwardly. Two one-piece brackets frictionally mount the lower leg of the upright arm on the side of the bus fender. The tubular brace has one end mounted on the front of the bus, usually on the front of the fender above the headlight. The other end of the brace is slotted and is frictionally connected to the intermediate leg of the main arm by another bracket or clamp. The slotted end of the brace is frictionally held by that bracket so that if the mounting assembly encounters an object, the brace can separate from the intermediate leg and arm can swing rearwardly, pivoting about the two brackets in which the lower leg is frictionally held.

The mounting assembly according to the invention is adaptable for a number of different bus designs or configurations. Further, with only one tubular arm and one tubular brace, and with the mounting brackets for the main arm being of one-piece construction, relatively few parts are involved and the mounting assembly is relatively inexpensive.

It is, therefore, a principal object of the invention to provide a mounting assembly for a mirror for a school bus which enables the bus driver to see the area in front of the bus otherwise hidden from direct view.

Another object of the invention is to provide a mirror mounting assembly for a school bus which can yield and swing back in the event an object is encountered.

Yet another object of the invention is to provide a mirror mounting assembly for a school bus which can be mounted on a variety of buses.

Still another object of the invention is to provide a mirror mounting assembly which is less expensive and involves fewer pieces.

Many other objects and advantages of the invention will be apparent from the following detailed description of a preferred embodiment thereof, reference being made to the accompanying drawings, in which:

BRIEF DESCRIPTION OF THE DRAWINGS

FIG. 1 is a somewhat schematic, fragmentary view in perspective of a school bus on which two mirror mounting assemblies in accordance with the invention are mounted;

FIG. 2 is a side view in elevation of part of a fender and an upright, generally Z-shaped tubular arm of the mounting assembly;

FIG. 3 is an enlarged view in transverse cross section taken along the line 3—3 of FIG. 2;

FIG. 4 is a plan view of a tubular brace of the mounting assembly, taken generally along the line 4—4 of FIG. 2; and FIG. 5 is an edge view of a connection between the upright arm and the tubular brace.

DETAILED DESCRIPTION OF THE PREFERRED EMBODIMENT

Referring to FIG. 1, a school bus indicated at 10 has a hood 12 and front fenders 14 and 16. The hood 12 causes a large area in front of the school bus to be hidden from direct view by the driver. Heretofore, children have been killed or injured when in this area and the bus moves forwardly.

Mirror mounting assemblies 18 and 20 are mounted on the fenders 14 and 16, respectively. The mounting assembly 18 has a rear view mirror 22 mounted thereon. The mounting assembly 20 has a rear view mirror 24 similarly mounted thereon and a front view mirror 26 with a convex reflecting surface. The mounting assemblies 18 and 20 are specifically designed for the front view mirror to position it so that the driver can see the hidden area in front of the bus. The various mirrors can be angularly adjusted to some extent by known pedestal posts having spherical heads received in central sockets in the backs of the mirrors with the pedestal posts having threaded shanks at the other ends.

Referring to FIGS. 2-5, the mounting assembly 18 includes a main upright, generally Z-shaped tubular arm 28 and a tubular brace 30. The tubular arm 28 has a lower upright leg or portion 32, an intermediate leg or portion 34 extending forwardly and upwardly, and an upper leg or portion 36 extending upwardly and rearwardly. The intermediate leg 34 forms an included angle of about 105° to about 135° and preferably about 120° with the lower leg 32. The upper leg 36 forms an included angle of about 75° to about 105° and preferably about 90° with the intermediate leg 34. The upper leg 36 has an upper flattened end 40 with a central hole 42 therein which can receive the threaded shank of the pedestal post which can be fixed thereto by suitable nuts and washers.

The lower upright leg 32 of the main arm 28 is affixed to the fender 14 by two one-piece mounting brackets 42. The brackets 42 are identical with the upper bracket 42 being shown in FIG. 3. It is made of one strip of metal and includes end flanges 44 and 46, parallel webs or shanks 48 and 50, and a partially cylindrical, intermediate portion 52. A bolt 56 extends through openings in the shanks 48 and 50 and receives a nut 58. When the nut 58 is tightened, the partially cylindrical intermediate portion 52 of the bracket frictionally engages the upright leg 32 of the main arm 28 to hold it in place. Bolts 60 extend through the flanges 44 and 46, through rubber washers 62, through the fender 14, through additional rubber washers 54 and through metal washers 66 where they threadedly receive nuts 68. This arrangement provides a secure attachment for the brackets 42 even when the fender 14 is of thinner fiber glas-reinforced plastic construction.

The tubular brace 30 has a flattened end 70 which can be mounted on a front portion of the fender 14 above a head-light or in a similar location. The flattened end 70 has a hole receiving a bolt 72 which extends through a rubber washer 74, the fender 14, another rubber washer 76, and a metal washer 78, threadedly receiving a nut 80. The other end of the tubular brace 30 also has a flattened end 82 which is generally perpendicular to the flattened end 70, in this instance. The flattened end 82 has a slot 84 extending longitudinally from an end edge of the flattened end 82 to an intermediate portion thereof. As shown in FIG. 5, a one-piece bracket or clamp 86 has end webs 88 and 90 located on the sides of the flattened end 82 and has an intermediate partially cylindrical portion 92. The latter portion extends around part of the intermediate leg 34 of the main arm 28 at a suitable location along its length. A bolt 94 extends through the web 88, the slot 84 of the flattened end 82, the web 90, and a metal washer 96. It threadedly receives a nut 98 which along with the bracket 86 connects the brace 30 to the main arm 28. The brackets 42 and 86 provide a secure connection for the mounting assembly 18 or 20 during normal operation. However, if the main arm 28 should encounter an object, it can yield to avoid injury. In such an instance, the slot 84 in the brace 30 enables the arm 28 to be separated from the brace 30. Since the brackets 42 frictionally engage the upright leg 32 of the main arm 28, the main arm can swing back to minimize possible injury.

As can be seen from above, the mounting assembly according to the invention is extremely adaptable and can be located on buses of various contours or designs. The mounting assembly can also be mounted on either the left or right fender. The brackets 42 can be mounted in various locations along the lower leg 32. The brace 30 likewise can be positioned at various locations along the intermediate leg 34 of the main arm 28 and the brace 30 can be pivoted to be mounted in various positions along the front of the bus. With the employment of only the main arm 28 and the one brace 30, and with the one-piece brackets 42 and 86, the number of pieces required for the mounting assembly are held to a minimum and also reduce the cost of the mounting assembly.

Various modifications of the above-described embodiment of the invention will be apparent to those skilled in the art and it is to be understood that such modifications can be made without departing from the scope of the invention, if they are within the spirit and the tenor of the accompanying claims.

I claim:

1. In combination, a school bus having a front fender with an upright side wall and a front wall, a mirror assembly for enabling an operator to see an area in front of the bus hidden from direct view, said assembly comprising a main tubular arm having a lower upright portion, an intermediate portion extending forwardly and upwardly, and an upper portion extending upwardly and rearwardly, a mirror movably mounted on said upper portion, two spaced one-piece brackets, each having a partially cylindrical portion around the lower upright portion of said arm, said cylindrical portion terminating in two spaced, generally parallel webs, said webs terminating in coplanar flanges extending outwardly from said webs, said webs having aligned first bolt holes therein, said flanges having second bolt holes therein, a first bolt for each bracket extending through said first bolt holes and a nut threaded on said first bolt to urge said webs toward one another and to cause said cylindrical portion to frictionally engage said upright portion of said arm, a first resilient washer between each of said flanges and the fender, a second bolt extending through each of said second bolt holes, said resilient washer, and the fender, a second resilient washer on a shank of each of said second bolts behind said fender, a metal washer on the shank behind said second resilient washer, and a second nut on the shank behind said metal washer, a brace clamp comprising a second partially cylindrical portion around said intermediate portion of said main arm and terminating in two second spaced, generally parallel webs, said second webs having third bolt holes therein, a third bolt extending through said third bolt holes, a third nut on a shank of said third bolt, a tubular brace terminating in two flat ends, one of said ends having a fourth bolt hole therein and the other of said ends having a longitudinally-extending slot terminating at an edge of said other flat end, said other flat end having said slots received on the shank of said third bolt between said second webs, said third nut and said third bolt frictionally holding said other flat end between said second webs and causing said second cylindrical portion to frictionally engage said intermediate portion of said main arm, a fourth bolt extending through said fourth bolt hole and the front wall of the bus fender, a third resilient washer between said one flat end and said front wall, and a fourth nut on a shank of said fourth bolt behind the front wall of the bus fender.

2. The combination according to claim 1 characterized by said upper portion of said main tubular arm having a flattened end and a hole therein to receive a post for said mirror.

3. The combination according to claim 1 characterized by said two flat ends of said tubular brace being substantially mutually perpendicular.

4. The combination according to claim 1 characterized by said intermediate portion of said main arm forming an included angle of about 105° to about 135° with said lower upright portion, and said upper portion forming an included angle of about 75° to about 105° with the intermediate portion.

5. A mounting assembly to be mounted on a school bus fender to enable an operator to see an area in front of the bus hidden from direct view, said assembly comprising a main tubular arm having a lower upright portion, an intermediate angular portion to extend forwardly and upwardly relative to the bus fender when said arm is mounted thereon, and an upper portion to extend rearwardly relative to the bus fender when said main arm is mounted thereon, two spaced one-piece brackets, each having a partially cylindrical portion around the lower upright portion of said arm, said cylindrical portion terminating in two spaced, generally parallel webs, said webs terminating in outwardly-extending, coplanar flanges, said webs having aligned first bolt holes therein, said flanges having second bolt holes therein, a first bolt for each bracket extending through said first bolt holes and a first nut threaded on a shank of said first bolt to urge said webs toward one another and to cause said cylindrical portion to frictionally engage said upright portion of said main arm, a brace clamp comprising a second partially cylindrical portion around the intermediate portion of said arm and terminating in two second spaced, generally parallel webs, said second webs having aligned third bolt holes, a second bolt extending through said third bolt holes and a second nut on a shank of said second bolt to urge said second webs toward one another to cause the second cylindrical portion to frictionally engage the intermediate portion of said arm, a brace terminating in two flat ends, one of said ends having a fourth bolt hole and the other of said ends having a longitudinally-extending slot terminating at an edge of said other end, said other flat end being received between the second webs, said second bolt extending through said slot and frictionally holding said other flat end between said second webs when said second nut is tightened on said second bolt.

6. A mounting assembly according to claim 5 characterized by said flat ends being at substantially mutually perpendicular angles to one another.

7. A mounting assembly according to claim 5 characterized by said upper portion having a flattened upper end with a hole therein to receive means for mounting a mirror thereon.

8. A mounting assembly according to claim 5 characterized by said intermediate portion of said main arm forming an included angle of about 105° to about 135° with said lower upright portion, and said upper portion forming an included angle of about 75° to about 105° with the intermediate portion.

9. A mounting assembly to be mounted on the body of a vehicle, said assembly comprising a main arm having a lower upright portion, an intermediate angular portion to extend upwardly and forwardly relative to the vehicle body when said arm is mounted thereon, and an upper portion extending upwardly from the intermediate angular portion, bracket means to be mounted on the vehicle body and frictionally engaging said lower upright portion of said arm, a brace clamp mounted on said intermediate portion of said arm and having bolt holes therein, a bolt extending through said bolt holes, and a nut on a shank of said bolt, a brace terminating in a flat end having a longitudinally-extending slot terminating at an edge of said end, said end being engaged by said clamp, said bolt extending through said slot and causing said clamp to frictionally engage said end when said nut is tightened on said bolt, the other end of said brace having means to mount said other end on said vehicle.

10. A mounting assembly according to claim 9 characterized by said other end of said brace being flat and located mutually perpendicular to said flat end.

11. A mounting assembly according to claim 10 characterized by said second flat end having a bolt hole therethrough.

12. A mounting assembly according to claim 9 characterized by said bracket means comprising two spaced, one-piece brackets frictionally engaging spaced portions of said lower upright portion of said arm.

13. A mounting assembly according to claim 12 characterized by each of said brackets having a partially cylindrical portion around the lower portion of said arm, said cylindrical portion terminating in two spaced, generally parallel webs, said webs terminating in coplanar flanges extending outwardly from said webs.

14. A mounting assembly according to claim 13 characterized by said webs having aligned bolt holes therein, a second bolt extending through said web bolt holes, and a second nut threaded on said second bolt to urge said webs toward one another and to cause said partially cylindrical portion to frictionally engage said lower upright portion of said arm.

15. A mounting assembly according to claim 9 characterized by said brace clamp comprising a partially cylindrical portion around said intermediate portion of said main arm and terminating in spaced, generally parallel webs, said webs having said bolt holes therein, said webs engaging said end when said nut is tightened on said bolt.

16. A mounting assembly according to claim 9 characterized by said intermediate portion of said main arm forming an included angle of about 105° to about 135° with said lower upright portion, and said upper portion forming an included angle of about 75° to about 105° with the intermediate portion.

* * * * *